No. 649,331. Patented May 8, 1900.
W. H. MARTIN.
FLUID PRESSURE REDUCING VALVE.
(Application filed Feb. 9, 1899.)
(No Model.)

Witnesses.

Inventor.
W. H. Martin,
by J. A. S. Pattison,
atty.

UNITED STATES PATENT OFFICE.

WILLIAM HAMILTON MARTIN, OF FLUSHING, NETHERLANDS.

FLUID-PRESSURE-REDUCING VALVE.

SPECIFICATION forming part of Letters Patent No. 649,331, dated May 8, 1900.

Application filed February 9, 1899. Serial No. 705,130. (No model.)

*To all whom it may concern:*

Be it known that I, WILLIAM HAMILTON MARTIN, a subject of the Queen of England, residing at Flushing, Netherlands, have invented Improvements in Fluid-Pressure-Reducing Valves, of which the following is a specification.

This invention has reference to valves for automatically reducing to any desired extent the pressure of fluid as it passes from the inlet to the outlet of the valve.

With steam-pressure-reducing valves as at present constructed a considerable amount of steam escapes at all times from the inlet to the outlet of the valve. Now one object of the present invention is to so construct such valves that the passage therethrough will when required be closed in a practically fluid-tight manner.

The accompanying drawings illustrate by way of example a construction of reducing-valve according to this invention.

Figure 1:
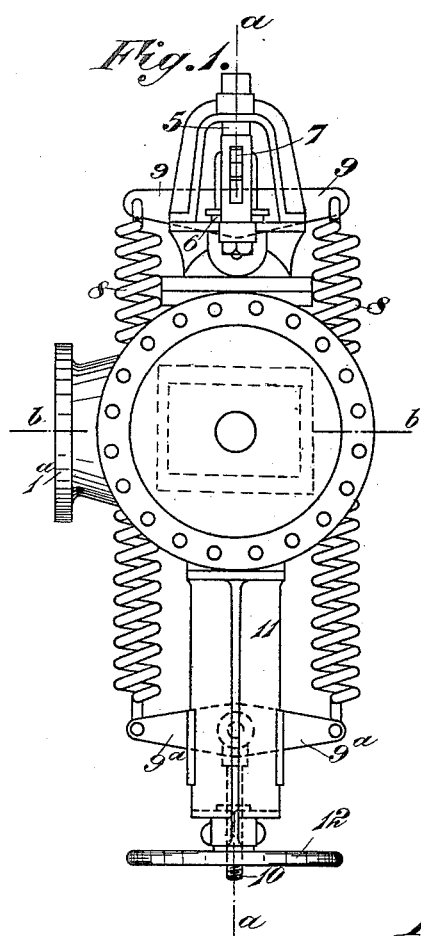
Figure 2:
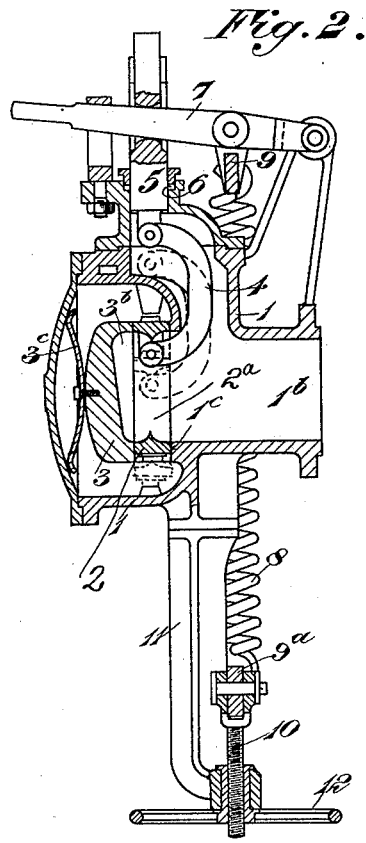
Figure 3:
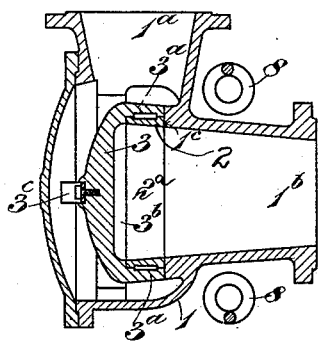

Figure 1 is an elevation; Fig. 2, a section on the line $a\,a$, Fig. 1; and Fig. 3, a section on the line $b\,b$, Fig. 1.

1 is the valve-casing, with inlet $1^a$ and outlet $1^b$ and having a faced valve-seat $1^c$. The valve proper, 2, which may be described as a flat slide-valve, is of flat rectangular shape with a corresponding port or opening $2^a$ through it. It is arranged to slide between the faced valve-seat $1^c$ and a suitable frame or plate 3 for relieving the pressure, the said frame being formed with projecting sides or edges $3^a$, that abut against the valve-seat, and also at that side of it which is adjacent to the valve 2 with a recess $3^b$ of similar shape to the port in the valve-seat. The frame 3 is pressed against the seat by a spring $3^c$.

4 is a curved link attached at one end to the valve 2 on the outlet or reduced-pressure side and the other end of which is connected with a spindle or plunger 5, shouldered so as to be moved by the outlet-pressure, that extends from the outlet side of the valve through a stuffing-box 6 to the atmosphere. It is preferable to form the spindle or plunger 5 of very hard and incorrodible metal, such as a nickel-steel alloy consisting of, say, about seventy-five per cent. of steel and twenty-five per cent. of nickel, as it is found in practice that if the plungers are formed of ordinary iron or steel they soon become corroded and if formed of gun-metal will not stand the wear for any considerable length of time. This spindle or plunger is coupled directly or by a suitable hand-lever 7 to springs 8, arranged outside of and adjustably attached to the valve-casing. In the example the ends of the springs are attached to cross-heads or yokes 9 $9^a$, connected, respectively, to the lever 7 and a screw-spindle 10, passing through a hole in an arm 11, attached to the valve-casing and fitted with a nut or hand-wheel 12, by means of which the tension on the springs can be varied.

In the drawings the valve 2 is shown closed—that is to say, the edges of its port $2^a$ coincide with those of the recess $3^b$ and with those of the port in the valve-seat. When, however, the valve is open, there is a space between the upper and lower ends of the frame 3 and the valve-seat $1^c$, the valve 2 then occupying the position indicated by dotted lines in Fig. 2 and steam passing by its upper end and through its port $2^a$ from both above and below, as indicated by the arrow.

$1^d$ and $1^e$ are lugs on the inner wall of the casing 1, arranged above and below the valve, so as to limit its movement.

Since the spindle or plunger 5, which is directly connected to the valve 2, extends from the outlet or reduced-pressure side of the valve, any variation in this pressure will tend to cause the opening or shutting of the passage through the valve, according as the pressure falls below or rises above the normal pressure for which the springs have been adjusted. The recess $3^b$ enables steam to pass when the valve is open through the port or opening in the slide-valve, as well as past the end of the said valve, thereby giving a large area of opening with a small movement of the valve.

Reducing - valves with balanced slide-valves, as above described, may be variously modified. For example, instead of an enlarged spindle or plunger and stuffing-box a cylinder and piston may be employed, one end of the cylinder being open to the reduced or low-pressure side of the valve and the other end open to the atmosphere or connected by a pipe to a surface condenser or other reservoir in which an approximately-uniform pressure is maintained.

Valves such as hereinbefore described and illustrated will not be liable to become jammed in the event of grit or the like getting between the working faces, as is the case with cylindrical valves and unbalanced valves.

What I claim is—

1. A fluid-pressure-reducing valve comprising a casing formed with an inlet, an outlet and a valve-seat, a flat slide-valve having an opening or port therethrough a pressure-relieving frame between which and said seat the slide-valve is arranged, and means whereby variations of pressure in the outlet cause corresponding movements of the slide-valve as set forth.

2. A fluid-pressure-reducing valve comprising a casing formed with an inlet, an outlet and a valve-seat, a flat slide-valve having an opening or port therethrough, a pressure-relieving frame edges of which abut against the valve-seat and between which and the valve-seat the slide-valve is arranged, and a loaded plunger connected to the slide-valve and subject to the pressure in the outlet of the valve-casing, as set forth.

3. A fluid-pressure-reducing valve comprising a casing formed with an inlet, an outlet and a valve-seat, a flat slide-valve having an opening or port therethrough, a pressure-relieving frame between which and the valve-seat the slide-valve is arranged and which is formed on the side adjacent to the valve with a recess, and means whereby variations of pressure in the outlet cause corresponding movements of the slide-valve, as set forth.

4. A fluid-pressure-reducing valve comprising a casing formed with an inlet, an outlet and a valve-seat, a flat slide-valve having an opening or port therethrough, a pressure-relieving frame edges of which abut against the valve-seat and which is formed on the side adjacent to the said seat with a recess of similar shape to the port in the valve-seat and means whereby variations of pressure in the outlet cause corresponding movements of the slide-valve, as set forth.

5. A fluid-pressure-reducing valve comprising a casing formed with an inlet, an outlet and a valve-seat, a flat slide-valve having an opening or port therethrough, a pressure-relieving frame formed with projecting edges which abut against the valve-seat and with a recess on the side adjacent thereto, a spring pressing the said frame against the seat and means whereby variations of pressure in the outlet cause corresponding movements of the slide-valve, as set forth.

6. A fluid-pressure-reducing valve comprising a casing formed with an inlet, an outlet and a valve-seat, a flat slide-valve having an opening or port therethrough, a pressure-relieving frame edges of which abut against the valve-seat, a plunger connected to the slide-valve and subject to the pressure in the outlet of the valve-casing, springs tending to cause an opening movement of the slide-valve and means whereby the tension of said springs may be varied.

7. A fluid-pressure-reducing valve comprising a casing 1 formed with an inlet $1^a$, an outlet $1^b$ and a valve-seat $1^c$, a flat slide-valve 2 having a rectangular port or opening $2^a$ therethrough, a pressure-relieving frame 3 formed with projecting edges $3^a$ and with a recess $3^b$ of similar shape to the said port or opening, a spring $3^c$, a link 4 connecting the slide-valve 2 with a plunger 5 that extends through the wall of the outlet $1^b$ and is coupled through a hand-lever 7 to springs 8, the tension of 8c which can be varied by means of a screw 10 and hand-wheel 12, as set forth.

Signed at the office of the notary public, Pieter de Maret Tak, at Flushing, Netherlands, this 25th day of January, 1899.

WILLIAM HAMILTON MARTIN.

Witnesses:
  A. FALEEN,
  M. A. MEYER.